United States Patent
Hayashi

(10) Patent No.: US 11,174,448 B2
(45) Date of Patent: Nov. 16, 2021

(54) TACTILE FILM, METHOD OF PRODUCING SAME, MOLDED ARTICLE, AND METHOD OF IMPROVING FINGER SLIDABILITY

(71) Applicant: Daicel Corporation, Osaka (JP)

(72) Inventor: Masaki Hayashi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 16/629,410

(22) PCT Filed: Oct. 11, 2018

(86) PCT No.: PCT/JP2018/037832
§ 371 (c)(1),
(2) Date: Jan. 8, 2020

(87) PCT Pub. No.: WO2019/082664
PCT Pub. Date: May 2, 2019

(65) Prior Publication Data
US 2020/0140774 A1   May 7, 2020

(30) Foreign Application Priority Data
Oct. 25, 2017   (JP) .............................. JP2017-206411

(51) Int. Cl.
*C10M 107/50* (2006.01)
*C10M 107/36* (2006.01)
(Continued)

(52) U.S. Cl.
CPC ........ *C10M 107/50* (2013.01); *C10M 107/36* (2013.01); *C10M 2209/123* (2013.01);
(Continued)

(58) Field of Classification Search
CPC ............ B32B 27/00; B32B 27/30; C08J 5/18; C10M 107/36; C10M 107/50;
(Continued)

(56) References Cited

U.S. PATENT DOCUMENTS

2003/0112520 A1   6/2003 Takahashi et al.
2010/0028682 A1   2/2010 Shinohara
(Continued)

FOREIGN PATENT DOCUMENTS

JP   2004-126495 A   4/2004
JP   2014-85371 A    5/2014
(Continued)

OTHER PUBLICATIONS

International Search Report, issued in PCT/JP2018/037832, PCT/ISA/210, dated Jan. 15, 2019.
(Continued)

*Primary Examiner* — Latosha Hines
(74) *Attorney, Agent, or Firm* — Birch, Stewart, Kolasch & Birch, LLP

(57) ABSTRACT

Prepared is a film including at least one surface having a friction property having A of not less than 0.01 and B of not greater than 0.6, A and B being values obtained from friction testing, wherein the friction testing includes measuring relative dynamic friction coefficients μ of the at least one surface at various moving speeds v (mm/s) of a contact probe, creating a plot of log(v), log(v) being a common logarithm of the moving speed, on a horizontal axis and μ on a vertical axis and performing linear fitting to obtain a straight line, and A is a slope of the straight line and B is an intercept of the straight line. The tactile film includes a tactile layer, which is formed of a cured product of a curable composition including a curable resin and is disposed on the outermost (Continued)

layer; and the surface of the tactile layer may have a friction property having a slope A of 0.01 or higher and an intercept B of 0.6 or lower. The curable resin may include a (meth) acrylic polymer having a polymerizable group, a urethane (meth)acrylate, a silicone (meth)acrylate, and a cellulose ester. The curable composition may include no fine particles. The tactile layer of the film may be laminated on a substrate layer formed of a transparent resin. The film has excellent finger slidability.

6 Claims, 1 Drawing Sheet

(51) Int. Cl.
    *C10N 40/14*     (2006.01)
    *C10N 50/08*     (2006.01)
(52) U.S. Cl.
    CPC . *C10M 2229/0525* (2013.01); *C10N 2040/14* (2013.01); *C10N 2050/08* (2013.01)
(58) Field of Classification Search
    CPC .... C10M 2209/123; C10M 2229/0525; C10N 2040/14; C10N 2050/08; G06F 3/016
    See application file for complete search history.

(56) References Cited

U.S. PATENT DOCUMENTS

| | | | | |
|---|---|---|---|---|
| 2011/0086227 | A1* | 4/2011 | Minemura | C09D 133/12 |
| | | | | 428/412 |
| 2015/0022748 | A1* | 1/2015 | Takeda | G02B 5/3033 |
| | | | | 349/33 |

FOREIGN PATENT DOCUMENTS

| | | |
|---|---|---|
| KR | 10-2007-0023545 A | 2/2007 |
| WO | WO 2008/038714 A1 | 4/2008 |
| WO | WO-2008038714 A1 * | 4/2008 ............. G02B 1/105 |

OTHER PUBLICATIONS

Written Opinion of the International Searching Authority, issued in PCT/JP2018/037832, PCT/ISA/237, dated Jan. 15, 2019.

English translation on International Preliminary Report on Patentability and Written Opinion for International Application No. PCT/JP2018/037832, dated May 7, 2020.

Korean Office Action for Korean Application No. 10-2020-7008183, dated Aug. 20, 2021, with English translation.

* cited by examiner

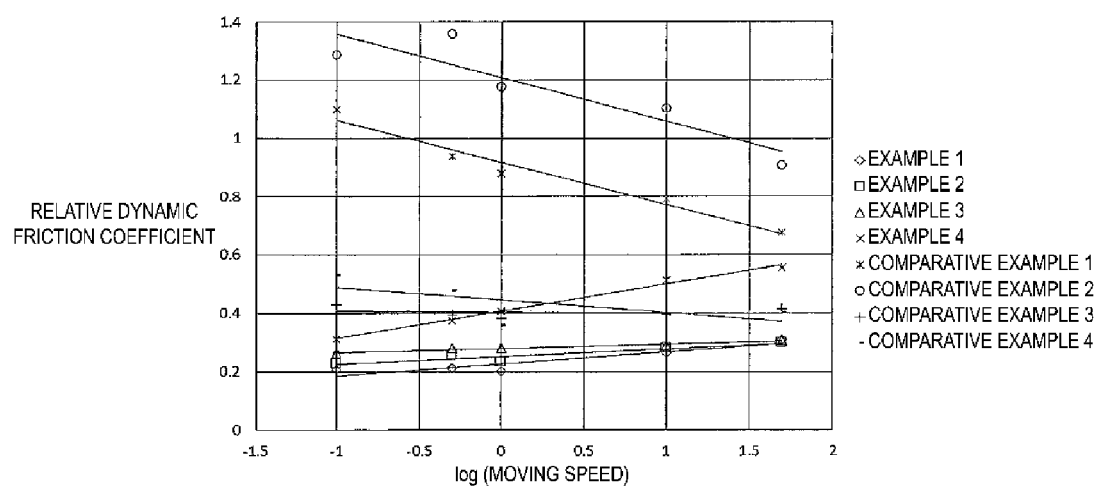

TACTILE FILM, METHOD OF PRODUCING SAME, MOLDED ARTICLE, AND METHOD OF IMPROVING FINGER SLIDABILITY

TECHNICAL FIELD

The present invention relates to a tactile film that can impart slidability (particularly finger slidability) to the surfaces of various molded articles such as touch panel displays, housings of consumer electronic products, or building materials, a method of producing the tactile film, a molded article, and a method of improving the slidability (particularly finger slidability) of the film.

BACKGROUND ART

In order to prevent scratches on or to improve tactile feel of surfaces of various molded articles such as touch panel displays of personal computers (PC) or smart phones, housings of consumer electronic products, building materials, or the like, a method of applying a hard coat film or a method of performing hard coat treatment to form a surface-protecting layer or a covering layer is known. Excellent slidability of the hard coat film or the hard coat layer when touched by hand is desired, and typically, as a method of improving the slidability, it is common to perform hard coat treatment which include a silicone compound or a fluorine compound.

JP 2007-264281 A (Patent Document 1) discloses a hard coat layer used in an optical laminate including a silicon-based compound, a fluorine-based compound, or a mixture thereof as an antifouling agent and/or a lubricant, wherein, according to XPS analysis of the uppermost surface of the hard coat layer, the abundance ratio of silicon atom is at least 10% and/or the abundance ratio of fluorine atom is at least 20%.

Additionally, WO 2008/038714 (Patent Document 2) discloses an optically functional film including a substrate, an optically functional layer superimposed on the substrate, and an antifouling layer formed on the optically functional layer, wherein at a surface of the antifouling layer, an element ratio of Si/C is from 0.25 to 1, Si/C being a ratio of silicon element (Si) to carbon element (C), and an element ratio of F/C is from 0.1 to 1 F/C, F/C being a ratio of fluorine element (F) to carbon element (C); the antifouling layer has a liquid paraffin contact angle and a liquid paraffin fall angle of 65° or greater and 15° or below, a black marking ink contact angle and a black marking ink fall angle of 35° or greater and 15° or below, and a dynamic friction coefficient of less than 0.15.

However, although the dynamic friction coefficient of a surface of the hard coat layer and the antifouling layer could be reduced by the silicone compound or the fluorine compound, there was no correlation with the actual finger slidability, and the finger slidability was not sufficient. In addition, since the surface becomes water-repellent, the hard coat layer and the antifouling layer could not be used for applications requiring hydrophilicity or oleophilicity, limiting the applications.

In addition, as a method of improving finger slidability, a method of imparting to a surface concavo-convex topography having high inclination and its feature distinctive from each other is also known, but sufficient finger slidability could not be obtained by the concavo-convex shapes alone.

CITATION LIST

Patent Document

Patent Document 1: JP 2007-264281 A (claim 1)
Patent Document 2: WO 2008/038714 (claim 1)

SUMMARY OF INVENTION

Technical Problem

Thus, an object of the present invention is to provide a tactile film having excellent slidability (particularly finger slidability), a method of producing the tactile film, a molded article, and a method of improving the slidability (particularly finger slidability) of the film.

Solution to Problem

As a result of diligent research to accomplish the task described above, the present inventors found that slidability (particularly finger slidability) can be improved by the following: a surface of a film has a friction property having A of not less than 0.015 and B of not greater than 0.15, A and B being values obtained from friction testing, in which the friction testing includes measuring relative dynamic friction coefficients μ of the at least one surface at various moving speeds v (mm/s) of a contact probe, creating a plot of log(v), log(v) being a common logarithm of the moving speed, on a horizontal axis and μ on a vertical axis and performing linear fitting to obtain a straight line, and A is a slope of the straight line and B is an intercept of the straight line. Thus, the present invention was completed.

That is, the film (tactile film) according to an embodiment of the present invention has a friction property having A of not less than 0.01 and B of not greater than 0.6, A and B being values obtained from friction testing, in which the friction testing includes measuring relative dynamic friction coefficients μ of the at least one surface at various moving speeds v (mm/s) of a contact probe, creating a plot of log(v), log(v) being a common logarithm of the moving speed, on a horizontal axis and μ on a vertical axis and performing linear fitting to obtain a straight line, and A is a slope of the straight line and B is an intercept of the straight line. The film includes a tactile layer, which is formed of a cured product of a curable composition including a curable resin and is disposed on the outermost layer; and the surface of the tactile layer may have a friction property represented by a straight line having a slope a of 0.01 or higher and an intercept b of 0.6 or lower. The curable resin may include at least one selected from the group consisting of a (meth)acrylic polymer having a polymerizable group, a urethane (meth)acrylate, and a silicone (meth)acrylate. The curable composition may further include a cellulose ester. The curable composition may include a (meth)acrylic polymer having a polymerizable group, a urethane (meth)acrylate, a silicone (meth)acrylate, and a cellulose ester. The curable composition may include no fine particles. The tactile layer of the film may be laminated on a substrate layer formed of a transparent resin.

The present invention also includes a method of producing the film which includes curing a curable composition containing a curable resin. Moreover, the present invention also includes a molded article which includes the film on a surface. The molded article may be a touch panel display. Further, the present invention includes a method of improving finger slidability of a film, in which improving the finger slidability includes adjusting surface topography of at least one surface of the film to have a friction property having A of not less than 0.01 and B of not greater than 0.6, A and B being values obtained from friction testing, where the friction testing includes measuring relative dynamic friction coefficients μ of the at least one surface at various moving speeds v (mm/s) of a contact probe, creating a plot of log(v), log(v) being a common logarithm of the moving speed, on a horizontal axis and μ on a vertical axis and performing linear fitting to obtain a straight line, and A is a slope of the straight line and B is an intercept of the straight line.

Advantageous Effects of Invention

According to an embodiment of the present invention, the surface of the film is adjusted to have a certain friction property, thus slidability (particularly finger slidability or tactile feel) can be improved.

BRIEF DESCRIPTION OF DRAWINGS

FIG. 1 is a graph illustrating the relationship between the logarithm of the moving speed of a contact probe on a surface of the tactile layer and the relative dynamic friction coefficient in Examples 1 to 4 and Comparative Examples 1 to 4.

DESCRIPTION OF EMBODIMENTS

Tactile Film

According to an embodiment of the present invention, a film (tactile film) includes at least one surface having a friction property measured by friction testing, in which the friction testing includes measuring relative dynamic friction coefficients μ of the at least one surface at various moving speeds v (mm/s) of a contact probe, creating a plot of log(v), log(v) being a common logarithm of the moving speed, on a horizontal axis and μ on a vertical axis and performing linear fitting to obtain a straight line, and the straight line satisfies the following relationships.

$$\mu = A \times \log(v) + B$$

where A≥0.01, B≤0.6.

In an embodiment according to the present invention, when the slope A and the intercept B of the straight line satisfy the range mentioned above, the dynamic friction force monotonically increases with respect to the moving speed of a finger when running (rubbing) the finger along the surface of the tactile film. Due to such a friction property, finger slidability can be improved. The details of the reason for improved finger slidability are not clear, but it is presumably due to the fact that, when moving an object, the largest force is generally required at the onset of motion, at which an impulse is large. That is, since the tactile film according to an embodiment of the present invention has such a property that the dynamic friction force is initially low and increases gradually as the moving speed increases, a user can slide the finger on the surface with a slight force, and can continue sliding the finger smoothly (with little feeling of friction).

It is sufficient for the slope A to be 0.01 or greater, but the slope A may be, for example, about from 0.01 to 0.15, preferably about from 0.02 to 0.12, and more preferably about from 0.03 to 0.1 (particularly about from 0.04 to 0.08). When the slope A is too small, the finger slidability is reduced when the intercept B is large. Meanwhile, when the slope A is too large, the finger slidability may decrease at an increased speed.

It is sufficient for the intercept B [the value of μ when log(v) is 0] to be 0.6 or less, but the intercept B may also be, for example, about from 0 to 0.5, preferably about from 0 to 0.45, and even more preferably about from 0 to 0.4 (particularly about from 0 to 0.35). When the intercept B is too large, the user may experience an increased feel of "catching" when the user starts to slide the finger, and finger slidability decreases.

Note that in the present specification and claims, the dynamic friction force can be measured using a static and dynamic friction measuring machine, and can be measured in detail by the method described in Examples below. In addition, the relative dynamic friction coefficient is a value obtained by dividing the dynamic friction force of a film measured at the same load by the dynamic friction force measured using glass as a specimen, and can be measured specifically by the method described in Examples below. This relative dynamic friction coefficient evaluates the friction properties of the film as a relative value of the dynamic friction force of a glass surface that is stable, and thus is a reliable evaluation metric in which errors due to changes over time of artificial skin are mitigated. Furthermore, the linear fitting for determining the slope A and the intercept B may be automatically determined by linear approximation using, for example, software "Excel" by Microsoft.

It is sufficient for the tactile film according to an embodiment of the present invention to have at least one surface with the friction property, and the material and structure of the film is not particularly limited.

With regard to the structure, the tactile film according to an embodiment of the present invention may be, for example, a single-layer film in which the friction property of at least one surface are adjusted to be within the range mentioned above, or a laminate including a tactile layer, with the friction property of a surface of the tactile layer being adjusted to be within the range mentioned above.

Single-Layer Film and Tactile Layer

As described above, the material of the single-layer film and the tactile layer is not limited, and can be selected from various types of organic materials (such as thermoplastic resins, thermosetting resins, and photocurable resins) or inorganic materials (such as glass, ceramics, and metals); however, from the perspective of productivity and the like, a cured product of a curable composition including a curable resin is preferable.

The curable resin may be either a thermosetting resin or a photocurable resin, but from the perspective of productivity and the like, a (meth)acrylic photocurable resin is widely used. In addition, (meth)acrylic resins, also having excellent transparency, can be suitably used as a protective film for optical applications such as a touch panel display.

Examples of (meth)acrylic photocurable resins include: multifunctional (meth)acrylates, such as (meth)acrylates having about 2 to 8 polymerizable groups, of which the examples are pentaerythritol tetra(meth)acrylate, dipentaerythritol penta(meth)acrylate, dipentaerythritol hexa(meth)acrylate, or the like; epoxy (meth)acrylates, such as multifunctional epoxy (meth)acrylates having two or more (meth)acryloyl groups; polyester (meth)acrylates, such as multifunctional polyester (meth)acrylates having two or more (meth)acryloyl groups; urethane (meth)acrylates, such as multifunctional urethane (meth)acrylates having two or more (meth)acryloyl groups; silicone (meth)acrylates, such as multifunctional silicone (meth)acrylates having two or more (meth)acryloyl groups; and (meth)acrylic polymers having a polymerizable group. These curable resins can be used alone or in combination of two or more.

Among these curable resins, a urethane (meth)acrylate, a silicone (meth)acrylate, a (meth)acrylic polymer having a polymerizable group are preferable, and a (meth)acrylic polymer having a polymerizable group is particularly preferable. The (meth)acrylic polymer having a polymerizable group may be a polymer in which a polymerizable unsaturated group is introduced into a part of carboxyl groups of a (meth)acrylate polymer, for example, a (meth)acrylic copolymer ("Cyclomer P", available from Daicel-Allnex Ltd.) in which a polymerizable group (photopolymerizable unsaturated group) is introduced into a side chain by reacting an epoxy group of an epoxy group-containing (meth) acrylate (for example, 3,4-epoxycyclohexenylmethyl acrylate) with a part of carboxyl groups of a (meth)acrylic acid-(meth)acrylate copolymer.

The (meth)acrylic polymer having a polymerizable group is preferably combined with a urethane (meth)acrylate and/or a silicone (meth)acrylate, and is particularly preferably combined with a urethane (meth)acrylate and a silicone (meth)acrylate.

In a case where the (meth)acrylic polymer having a polymerizable group is combined with a urethane (meth)acrylate and/or a silicone (meth)acrylate, the ratio of the urethane (meth)acrylate is, for example, about from 10 to 300 parts by weight, preferably about from 100 to 200 parts by weight, and more preferably about from 120 to 180 parts by weight per 100 parts by weight of the (meth)acrylic polymer having a polymerizable group. The ratio of the silicone (meth)acrylate is, for example, about from 0.1 to 10 parts by weight, preferably about from 0.5 to 5 parts by weight, and more preferably about from 1 to 3 parts by weight per 100 parts by weight of the (meth)acrylic polymer having a polymerizable group.

The curable composition may further include a cellulose ester in addition to the curable resin. Examples of the cellulose ester include: cellulose acetates, such as cellulose diacetates and cellulose triacetates; cellulose $C_{2-6}$ acylates, such as cellulose propionates, cellulose butyrates, cellulose acetate propionates, and cellulose acetate butyrates. These cellulose esters can be used alone or in combination of two or more. Among those, cellulose diacetates, cellulose triacetates, and cellulose $C_{2-4}$ acylates such as cellulose acetate propionates and cellulose acetate butyrates are preferred, and cellulose acetate $C_{3-4}$ acylates such as cellulose acetate propionates are particularly preferred. The ratio of the cellulose ester is, for example, about from 0.1 to 30 parts by weight, preferably from 1 to 20 parts by weight, more preferably from 2 to 10 parts by weight (particularly from 3 to 5 parts by weight) with respect to 100 parts by weight of the curable resin.

The curable composition may further include fine particles in addition to the curable resin. Examples of the fine particles include: inorganic fine particles, such as silica particles, titania particles, zirconia particles, and alumina particles; organic fine particles, such as copolymer particles of a (meth)acrylic monomer and a styrene-based monomer, crosslinked (meth)acrylic polymer particles, and crosslinked styrene-based resin particles. These fine particles can be used alone or in combination of two or more types. Among these, crosslinked (meth)acrylic polymer particles or the like are widely used. The mean particle size of the fine particles is, for example, about from 0.2 to 30 μm, preferably about from 0.5 to 20 μm, and more preferably about from 1 to 15 μm. The ratio of the fine particles is, for example, about from 0.1 to 10 parts by weight, preferably about from 0.2 to 5 parts by weight, more preferably about from 0.3 to 3 parts by weight (particularly about from 0.4 to 1 parts by weight) per 100 parts by weight of the curable resin.

Note that in an embodiment according to the present invention, when the curable resin (in particular, when the curable resin is a combination of a (meth)acrylic polymer having a polymerizable group and a urethane (meth)acrylate and/or a silicone (meth)acrylate) is combined with a cellulose ester, a surface having the friction property can be formed without using fine particles.

In addition to the curable resin, the curable composition may contain commonly used additives, such as polymerization initiators, stabilizers (antioxidants, ultraviolet absorbing agents, etc.), surfactants, water-soluble polymers, fillers, cross-linking agents, coupling agents, coloring agents, flame retardants, lubricants, waxes, preservatives, viscosity modifiers, thickening agents, leveling agents, or antifoaming agents. These additives can be used alone or in combination of two or more types.

When the curable composition is a photocurable composition, the photocurable composition may include a photopolymerization initiator as a polymerization initiator. Examples of the photopolymerization initiator include acetophenones or propiophenones, benzyls, benzoins, benzophenones, thioxanthones, and acylphosphine oxides. The photopolymerization initiator may include a typical photosensitizer or photopolymerization accelerator (for example, tertiary amines). The ratio of the photopolymerization initiator is, for example, about from 0.1 to 10 parts by weight, preferably about from 0.5 to 5 parts by weight, and more preferably about from 1 to 3 parts by weight per 100 parts by weight of the photocurable resin.

The curable composition before curing may further contain a solvent. Examples of the solvent include ketones, ethers, hydrocarbons, esters, water, alcohols, cellosolves, cellosolve acetates, sulfoxides, and amides. In addition, the solvent may be a mixed solvent. Among these solvents, it is preferable that ketones (such as acetone, methyl ethyl ketone, methyl isobutyl ketone, and cyclohexanone) are included, and a mixed solvent of ketones and alcohols (such as ethanol, isopropanol, butanol, and cyclohexanol) is particularly preferable. The ratio of the solvent is, for example, about from 30 to 300 parts by weight, preferably about from 50 to 250 parts by weight, and more preferably about from 100 to 200 parts by weight per 100 parts by weight of the curable resin.

The average thickness of the single-layer film and the tactile layer is each, for example, about from 1 to 30 μm, preferably about from 3 to 20 μm, and more preferably about from 4 to 15 μm (particularly about from 5 to 10 μm). Note that in the present specification and claims, the average thickness of the single-layer film and the tactile layer can be measured by the method described in Examples below.

Laminate

When the tactile film is a laminate, it is sufficient that the tactile layer is disposed on an outermost surface; while a structure of the laminate is not particularly limited, from the perspective of productivity, handling, or the like, a structure in which the tactile layer is laminated on the substrate layer (a laminate of a substrate layer and a tactile layer laminated on one surface of the substrate layer) is preferable.

While the material of the substrate layer is not particularly limited, and can be selected from various types of organic materials (thermoplastic resins, thermosetting resins, photocurable resins, or the like) or inorganic materials (glass, ceramics, metals, or the like), a transparent material is preferable when the substrate layer is used in a protective film for optical applications such as a touch panel display.

Examples of the transparent material include: inorganic materials, such as glass; organic materials, such as a cellulose ester, a polyester, a polyamide, a polyimide, a polycarbonate, and a (meth)acrylic polymer. Among these, cellulose esters, polyesters, polycarbonates, or the like are widely used.

Examples of the cellulose ester include cellulose acetate such as cellulose triacetate (TAC), and cellulose acetate $C_{3-4}$ acylate such as cellulose acetate propionate and cellulose acetate butyrate. Examples of the polyester include polyalkylenearylates such as polyethylene terephthalate (PET) and polyethylene naphthalate (PEN). Examples of the polycarbonate include bisphenol A type polycarbonate or the like.

Among those, poly $C_{2-4}$ alkylene $C_{8-12}$ arylate such as PET and PEN and bisphenol A type polycarbonate are preferred from the perspective of having an excellent balance in mechanical properties, transparency, or the like.

The substrate layer formed of polyester may be a uniaxially or biaxially stretched film, but may also be an unstretched film from the perspective of having a low birefringence and excellent optically isotropic properties.

The substrate layer may be subjected to surface treatment (for example, corona discharge treatment, flame treatment, plasma treatment, ozone or ultraviolet irradiation treatment, or the like), and may have an easily adhesive layer.

An average thickness of the substrate layer may be 10 μm or greater, for example, about from 12 to 500 μm, preferably about from 20 to 300 μm, and more preferably about from 30 to 200 μm.

Adhesive Layer

The tactile film according to an embodiment of the present invention may have an adhesive layer formed on at least a portion of the back surface (such as the back surface of the tactile film in the single-layer film, the surface of the substrate layer, or the like) opposite the surface having a friction property within the range mentioned above. The tactile film having an adhesive layer formed on the back surface can also be used as a protective film on a touch panel display such as that of a smart phone or a tablet PC.

The adhesive layer is formed of a typical transparent adhesive. Examples of the adhesive include rubber-based adhesives, acrylic-based adhesives, olefin-based adhesives (such as modified olefin adhesives), and silicone-based adhesives. These adhesives can be used alone or in combination of two or more types. Among these adhesives, silicone adhesives are preferable from the perspective of optical properties, reworkability, or the like.

The average thickness of the adhesive layer is, for example, about from 1 to 150 μm, preferably about from 10 to 100 μm, more preferably about from 20 to 70 μm (particularly about from 25 to 50 μm).

The adhesive layer may be formed on the entire back surface, or may be formed on a portion (for example, a peripheral portion) of the back surface. Further, in a case where the adhesive layer is formed on the peripheral portion, in order to improve the handling during adhering, the adhesive layer can be formed on a frame-like member which is formed on the peripheral portion of the tactile film (for example, a plastic sheet laminated on the peripheral portion).

Method of Producing Tactile Film

The method of producing the tactile film according to an embodiment of the present invention is not particularly limited as long as the method can impart the friction property within the range mentioned above to a surface, and can be appropriately selected depending on the material of the tactile film. For example, the tactile film may be produced by a method that forms certain fine concavo-convex topography on a surface. Specific production methods include, for example, a method that includes curing a curable composition containing a curable resin (for example, a method of curing a curable composition including fine particles and making the fine particles to protrude above the surface, a method of curing a curable composition containing a resin component that can be phase-separated after phase-separating the resin component, or the like); a method of transferring concavo-convex structures using a mold having concavo-convex structures on a surface, a method of forming concavo-convex structures by cutting (for example, cutting using lasers or the like), a method of forming concavo-convex structures by polishing (for example, sand blasting method, bead shot method, or the like), a method of forming concavo-convex structures by etching.

Among these methods, from the perspective of producing a tactile film of which the friction property of the surface is adjusted to be within the range mentioned above, with high productivity, the method that includes curing a curable composition containing a curable resin is preferable; for example, the method may include coating a liquid curable composition on a substrate (when the tactile film is a laminate, the substrate layer constituting the tactile film) and dries the coating, and then cures the coating.

Examples of the coating method include typical methods such as coater methods, which include the roll coater method, the air knife coater method, the blade coater method, the rod coater method, the reverse coater method, the bar coater method, the comma coater method, the dip squeeze coater method, the die coater method, the gravure coater method, the micro gravure coater method, and the silk screen coater method, as well as a dipping method, a spraying method, and a spinner method. Among these methods, the bar coater method or the gravure coater method are widely used. As necessary, the coating solution may be applied a plurality of times.

The drying temperature is, for example, about from 30 to 120° C., preferably about from 50 to 110° C., more preferably about from 60 to 100° C. (particularly about from 70 to 90° C.). The drying time is, for example, about from 0.1 to 10 minutes, preferably about from 0.3 to 5 minutes, and more preferably about from 0.5 to 3 minutes.

The curing method may be any method that providing active radiation (ultraviolet rays, electron beams, or the like), heat, or the like depending on the type of the curable resin. In the case of a photocurable resin, the photoirradiation can be selected depending on the type of the photocurable resin, and typically, ultraviolet rays, electron beams, or the like can be used. A general-purpose exposure source is usually an ultraviolet irradiation device.

Examples of the light source include a deep UV lamp, a low-pressure mercury lamp, a high-pressure mercury lamp, an ultrahigh-pressure mercury lamp, a halogen lamp, and a laser light source (light source such as a helium-cadmium laser and an excimer laser) in the case of the ultraviolet rays. The amount of irradiation light (irradiation energy) varies depending on the thickness of the coating film, and is, for example, about from 10 to 10000 $mJ/cm^2$, preferably about from 20 to 5000 $mJ/cm^2$, and more preferably about from 30 to 3000 $mJ/cm^2$. As necessary, the light irradiation may be performed in an inert gas atmosphere.

In such method of curing a curable composition, examples of a method of forming concavo-convex structures which imparts the friction property adjusted to be within the range mentioned above to a surface include: a method of blending fine particles in the curable composition, making the fine particles to protrude, and curing the curable composition (a method using fine particles); a method of blending a resin component that can be phase-separated into the curable composition and curing the resin component after phase separation (a method using phase separation).

In the method that uses fine particles, the concavo-convex structures can be formed on a surface by curing the curable composition with fine particles protruded from the surface.

In the method that uses phase separation, phase separation by spinodal decomposition (wet spinodal decomposition) may occur along with the concentration of the composition during the process of evaporating or removing the solvent, by drying or the like, from the liquid phase of the composition including the resin component that can be phase-separated and the solvent, forming concavo-convex structures on a surface with relatively regular correlation distances (phase separation structure). Examples of methods that use phase separation include the methods described in JP 2007-187746 A, JP 2008-225195 A, JP 2009-267775 A, JP 2011-175601 A, and JP 2014-85371 A. The combination of resin components that can be phase-separated is preferably a combination of a (meth)acrylic polymer having a polymerizable group, a urethane (meth)acrylate, a silicone (meth)acrylate, and a cellulose ester.

EXAMPLE(S)

Hereinafter, the present invention is described in greater detail based on examples, but the present invention is not limited to these examples. The raw materials used in Examples and Comparative Examples are as follows, and the tactile film obtained was evaluated by the following method.

Raw Material

Acrylic-based polymer having a polymerizable group: "Cyclomer P", available from Daicel-Allnex Ltd.

Cellulose acetate propionate: "CAP-482-20", available from Eastman Chemical Company, degree of acetylation=2.5%, degree of propionylation=46%, number average molecular weight calibrated with polystyrene is 75000

Urethane acrylate: "UA-53H" available from Shin-Nakamura Chemical Co., Ltd.

Silicone acrylate: "EBECRYL 1360", available from Daicel-Allnex Ltd.

Dipentaerythritol hexaacrylate: "DPHA", available from Daicel-Allnex Ltd.

Pentaerythritol tetraacrylate: "PETRA", available from Daicel-Allnex Ltd.

Translucent silica particles: "OK-500" (average particle size 6.3 μm, refractive index 1.46), available from Degussa Styrene-acrylic copolymer particles: "SMX series (average particle size 3.5 μm, refractive index 1.56)", available from Sekisui Chemical Co., Ltd.

Polystyrene particles: "SX-350 H (average particle size 3.5 μm, refractive index 1.59)", available from Soken Chemical & Engineering Co., Ltd.

Photoinitiator A: "Irgacure 184" available from BASF Japan Ltd.

Photoinitiator B: "Irgacure 907" available from BASF Japan Ltd.

Polyethylene terephthalate (PET) film: "DIAFOIL" available from Mitsubishi Plastics, Inc.

Polycarbonate (PC) film: "LEXAN", available from Sabic.

Thickness of Tactile Layer

Using an optical film thickness gauge, ten arbitrary points were measured, and an average value was calculated.

Relative Dynamic Friction Coefficient

Dynamic friction force was measured under measurement conditions (a load of 20 g and a speed of 25 mm/seconds) using a static and dynamic friction measurement system ("Handy Tribomaster TL201 Ts", available from Trinity-Lab. Inc.). As the contact probe, an artificial skin ("BIO-SKIN", available from Beaulux Co., Ltd.) was attached to a sponge sheet ("Sukima-Yo Tape N-1" manufactured by Cemedine Co., Ltd.) having a thickness of 5 mm. The dynamic friction force was measured at various moving speeds of the contact probe. The relative dynamic friction coefficient was determined by dividing the dynamic friction force of the film, which is the subject of the measurement, by the dynamic friction force measured using glass (soda lime glass) as a specimen.

Finger Slidability

The evaluation of finger slidability was performed as follows: The obtained tactile film was attached to a glass plate on the substrate layer side using an optical clear adhesive (OCA) film having a thickness of 25 μm, to prepare a testing piece. Evaluation was carried out by sliding an index finger on the surface of the film (tactile layer) of the test piece in the manner of operating a smartphone. The evaluation results were interviewed on 20 subjects according to the following five tiered criteria.

One point: the finger does not slide very well, and the finger catches during operation Two points: the finger catches at the onset of sliding, and feels high friction after sliding starts Three points: the finger catches at the onset of sliding, but feels low friction after sliding starts Four points: the finger slightly catches at the onset of sliding, but feels no friction during operation Five points: the finger does not catch at the onset of sliding, and feels no friction during operation.

Example 1

50 parts by weight of the acrylic-based polymer having a polymerizable group, 4 parts by weight of the cellulose acetate propionate, 76 parts by weight of the urethane acrylate, 1 part by weight of the silicone acrylate, 1 part by weight of the photoinitiator A, and 1 part by weight of the photoinitiator B were dissolved in a mixed solvent of 176 parts by weight of methyl ethyl ketone and 28 parts by weight of 1-butanol. The solution was cast on a PET film using a wire bar #18, and then was left in an oven at 80° C. for 1 minute to evaporate the solvent and form a tactile layer having a thickness of about 9 μm. Then, the tactile layer was irradiated with ultraviolet rays from a high-pressure mercury lamp for about 5 seconds (total irradiation dose of about 100 mJ/cm$^2$) and subjected to UV curing treatment to form a tactile film.

Example 2

62.5 parts by weight of the acrylic-based polymer having a polymerizable group, 5 parts by weight of the cellulose acetate propionate, 70 parts by weight of the urethane acrylate, 1 part by weight of the silicone acrylate, 1 part by weight of the photoinitiator A, and 1 part by weight of the photoinitiator B were dissolved in a mixed solvent of 176 parts by weight of methyl ethyl ketone and 28 parts by weight of 1-butanol. The solution was cast on a PC film using a wire bar #18, and then was left in an oven at 80° C.

for 1 minute to evaporate the solvent and form a tactile layer having a thickness of approximately 9 µm. Then, the tactile layer was irradiated with ultraviolet rays from a high-pressure mercury lamp for about 5 seconds (total irradiation dose of about 100 mJ/cm$^2$) and subjected to UV curing treatment to obtain a tactile film.

Example 3

50 parts by weight of the acrylic-based polymer having a polymerizable group, 4 parts by weight of the cellulose acetate propionate, 38 parts by weight of the urethane acrylate, 1 part by weight of the silicone acrylate, 10 parts by weight of the translucent silica particles, and 1 part by weight of the photoinitiator B were dissolved in a mixed solvent of 176 parts by weight of methyl ethyl ketone and 28 parts by weight of 1-butanol. The solution was cast on a PET film using a wire bar #18, and then was left in an oven at 80° C. for 1 minute to evaporate the solvent and form a tactile layer having a thickness of about 9 µm. Then, the tactile layer was irradiated with ultraviolet rays from a high-pressure mercury lamp for about 5 seconds (total irradiation dose of about 100 mJ/cm$^2$) and subjected to UV curing treatment to obtain a tactile film.

Example 4

50 parts by weight of the acrylic-based polymer having a polymerizable group, 11 parts by weight of the cellulose acetate propionate, 60 parts by weight of the DPHA, 7 parts by weight of the silicone acrylate, 2 parts by weight of the photoinitiator A, and 1 part by weight of the photoinitiator B were dissolved in a mixed solvent of 222 parts by weight of methyl ethyl ketone and 45 parts by weight of 1-butanol. The solution was cast on a PET film using a wire bar #16, and then was left in an oven at 100° C. for 1 minute to evaporate the solvent and form a tactile layer having a thickness of about 6 µm. Then, the tactile layer was irradiated with ultraviolet rays from a high-pressure mercury lamp for about 5 seconds (total irradiation dose of about 100 mJ/cm$^2$) and subjected to UV curing treatment to obtain a tactile film.

Comparative Example 1

45 parts by weight of the acrylic-based polymer having a polymerizable group, 4.5 parts by weight of the cellulose acetate propionate, 46.5 parts by weight of the DPHA, 31 parts by weight of the PETRA, 2 parts by weight of the photoinitiator A, and 1 part by weight of the photoinitiator B were dissolved in a mixed solvent of 107 parts by weight of methyl ethyl ketone, 18 parts by weight of 1-butanol, and 53 parts by weight of methoxypropanol. The solution was cast on a PET film using a wire bar #14, and then was left in an oven at 100° C. for 1 minute to evaporate the solvent and form a tactile layer having a thickness of about 8 µm. Then, the tactile layer was irradiated with ultraviolet rays from a high-pressure mercury lamp for about 5 seconds (total irradiation dose of about 100 mJ/cm$^2$) and subjected to UV curing treatment to obtain a tactile film.

Comparative Example 2

100 parts by weight of the PETRA, 10 parts by weight of the styrene-acrylic copolymer particles, and 16.5 parts by weight of the polystyrene particles were mixed. A particle dispersion solution was obtained by blending 133 parts by weight of toluene and 57 parts by weight of cyclohexanone as a solvent in this mixture. The particle dispersion solution was cast on a PET film using a wire bar #10, and then was left in an oven at 90° C. for 1 minute to evaporate the solvent and form a tactile layer having a thickness of about 5 µm. Then, the tactile layer was irradiated with ultraviolet rays from a high-pressure mercury lamp for about 5 seconds (total irradiation dose of about 100 mJ/cm$^2$) and subjected to UV curing treatment to obtain a tactile film.

Comparative Example 3

PM-A15FLGM (available from ELECOM), a protective sheet for smartphones available in the market, was used as a comparative example of a film on which a finger slides well because it was proclaimed as an "ultimate finger sliding film" or a "super smooth film" on the package.

Comparative Example 4

PM-A15FLST (available from ELECOM), a protective sheet for smartphones available in the market, was used as a comparative example of a film on which a finger slides well because it was proclaimed to facilitate "smooth finger sliding" or to be a "super smooth film" on the package.

Table 1 shows the results of the relative dynamic friction coefficient µ of the tactile films obtained in the Examples and Comparative Examples and the common logarithm log(v) of the moving speed of the contact probe. Moreover, FIG. 1 shows the graph in which the results of Table 1 were plotted using software "Excel" from Microsoft. Furthermore, Table 2 shows the results of linear fitting on each plot of the graph and the slopes and intercepts determined from the linear fitting. Table 2 also shows the results of evaluation of finger slidability on the tactile films of each of the Examples and Comparative Examples.

TABLE 1

| Moving speed v (mm/s) | Log(v) (mm/s) | Examples | | | | Comparative Examples | | | |
|---|---|---|---|---|---|---|---|---|---|
| | | 1 | 2 | 3 | 4 | 1 | 2 | 3 | 4 |
| 0.1 | −1.000 | 0.206 | 0.227 | 0.264 | 0.312 | 1.099 | 1.287 | 0.429 | 0.532 |
| 0.5 | −0.301 | 0.211 | 0.256 | 0.280 | 0.377 | 0.938 | 1.359 | 0.395 | 0.478 |
| 1 | 0.000 | 0.202 | 0.234 | 0.280 | 0.409 | 0.880 | 1.177 | 0.384 | 0.359 |
| 10 | 1.000 | 0.265 | 0.281 | 0.289 | 0.513 | 0.793 | 1.103 | 0.396 | 0.398 |
| 50 | 1.699 | 0.310 | 0.298 | 0.308 | 0.555 | 0.677 | 0.906 | 0.415 | 0.403 |

TABLE 2

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Slope A | 0.0410 | 0.0263 | 0.0147 | 0.0926 | −0.1449 | −0.1492 | −0.0025 | −0.0435 |
| Intercept B | 0.2274 | 0.2519 | 0.2802 | 0.4073 | 0.9181 | 1.2083 | 0.4044 | 0.4462 |
| Finger slidability | 5 | 5 | 4 | 4 | 2 | 1 | 3 | 3 |

As is clear from the results shown in Tables 1 and 2, with the tactile films of the Examples, the finger did not catch at the onset of sliding the finger, and could slide smoothly even with increased moving speed, exhibiting superior finger slidability.

INDUSTRIAL APPLICABILITY

The tactile film according to an embodiment of the present invention can be used as a surface-protecting or covering film for covering the surface of various molded articles such as touch panel displays of personal computers (tablet PCs, etc.) and smartphones, housings of consumer electronic products, building materials, or the like. In particular, the film is useful as a film that improves the tactile feel by improving the slidability of a part that is operated by hand touch.

The invention claimed is:

1. A film comprising at least one surface having a friction property having A of not less than 0.01 and B of not greater than 0.6, A and B being values obtained from friction testing, wherein
   the friction testing includes measuring relative dynamic friction coefficients μ of the at least one surface at various moving speeds v (mm/s) of a contact probe, creating a plot of log(v), log(v) being a common logarithm of the moving speed, on a horizontal axis and μ on a vertical axis and performing linear fitting to obtain a straight line, and
   A is a slope of the straight line and B is an intercept of the straight line,
   wherein the film comprises a tactile layer formed of a cured product of a curable composition, and the tactile layer is disposed on an outermost layer; and the surface of the tactile layer has a friction property having a slope A of not less than 0.015 and an intercept B of not greater than 0.15,
   wherein the curable composition comprises a curable resin and a cellulose ester,
   wherein the curable resin comprises a (meth)acrylic polymer including a polymerizable group, a urethane (meth)acrylate, and a silicone (meth)acrylate, and
   wherein a ratio of the cellulose ester is from 2 to 10 parts by weight with respect to 100 parts by weight of the curable resin.

2. The film according to claim 1, wherein the curable composition comprises no fine particles.

3. The film according to claim 1, wherein the tactile layer is laminated on a substrate layer formed of a transparent resin.

4. A method of producing the film described in claim 1, wherein the method comprises curing a curable composition comprising a curable resin.

5. A method of improving finger slidability of the film according to claim 1, wherein improving the finger slidability includes adjusting surface topography of at least one surface of the film to have a friction property having A of not less than 0.01 and B of not greater than 0.6, A and B being values obtained from friction testing, wherein
   the friction testing includes measuring relative dynamic friction coefficients μ of the at least one surface at various moving speeds v (mm/s) of a contact probe, creating a plot of log(v), log(v) being a common logarithm of the moving speed, on a horizontal axis and μ on a vertical axis and performing linear fitting to obtain a straight line, and
   A is a slope of the straight line and B is an intercept of the straight line.

6. The film according to claim 1, wherein the ratio of the cellulose ester is from 3 to 5 parts by weight with respect to 100 parts by weight of the curable resin.

* * * * *